United States Patent [19]

Chaudanson

[11] Patent Number: 5,113,406
[45] Date of Patent: May 12, 1992

[54] HIGH TEMPERATURE HEATING DEVICE
[75] Inventor: Bernard Chaudanson, Lagarde Adhemar, France
[73] Assignee: Commissariat A L'Energie Atomique, Paris, France
[21] Appl. No.: 487,957
[22] PCT Filed: Sep. 26, 1989
[86] PCT No.: PCT/FR89/00490
  § 371 Date: May 14, 1990
  § 102(e) Date: May 14, 1990
[87] PCT Pub. No.: WO90/03673
  PCT Pub. Date: Apr. 5, 1990
[30] Foreign Application Priority Data
  Sep. 27, 1988 [FR] France ............................ 88 12613
[51] Int. Cl.$^5$ .............................................. H01S 3/22
[52] U.S. Cl. ............................. 372/56; 372/55; 372/61
[58] Field of Search ...................... 372/56, 61; 11/55
[56] References Cited
  U.S. PATENT DOCUMENTS
  4,956,845  9/1990  Otto et al. ........................... 372/56

OTHER PUBLICATIONS

Journal of Physics E/Scientific Insturments, vol. 21, No. 4, Apr. 1988, IOP Publishing Ltd. J. K. Mittal et al.: "Design and Performance of a 20 Watt Copper Vapour Laser", pp. 388-392.
Applied Physics B/Photophysics & Laser Chemistry, vol. B44, No. 1, Sept. 1987, Springer-Verlag, Z. G. Huang et al.: "A Gold-Vapor Laser Using Ne-H$_2$ as Buffer Gas", pp. 57-59.
Soviet Journal of Quantum Electronics, vol. 7, No. 12, Dec. 1978, American Institute of Physics, H. Kneipp et al.: "Discharge-heated Copper Vapor Laser", pp. 1454-1455.

Primary Examiner—Georgia Y. Epps
Attorney, Agent, or Firm—Oblon, Spivak, McClelland, Maier & Neustadt

[57] ABSTRACT

A device for high temperature heating including a container a filled with a buffer gas, two electrodes in the container that are fixed to the container, and an alternating current power supply coupled to the two electrodes through a leakage field transformer. The primary windings of the leakage field transformer are coupled to the alternating current power supply and the secondary windings of the leakage field transformer are connected to the electrodes in the container.

13 Claims, 3 Drawing Sheets

HIGH TEMPERATURE HEATING DEVICE

FIELD OF THE INVENTION

The present invention relates to a very high temperature heating device. Its field of application covers numerous industrial activities requiring temperatures which can reach 2500° C. It is more particularly applicable to maintaining at high temperature the metal in a metal vapour laser or for the degassing of certain materials.

DISCUSSION OF THE RELATED ART

In practice, it is very difficult to obtain high temperatures (above 1000° C.). The main known devices use the Joule effect, induction or heating by electric impulsive or d.c. discharges.

The example of maintaining at high temperature a metal with a view to its vaporization in a metal vapour laser illustrates particularly well the problem caused by high temperature heating. An enclosure contains balls of the metal to be vaporized in the atmosphere of a buffer gas. In order to prepare its vaporization, the balls are raised to a temperature close to 1000° C.

Certain known devices use a heating jacket for enveloping the enclosure containing the metal balls. This jacket is traversed by a current and therefore gives off heat through the Joule effect. It is connected to a d.c. power supply supplying very low voltages of approximately 20V.

Apart from the fact that these devices require a sophisticated d.c. supply, the heating jacket is fragile and has a limited life.

In order to heat the metal prior to its vaporization, other known devices directly use impulsive electric discharges permitting the laser effect. These impulsive discharges are obtained from a thyratron trigger system connected to a d.c. power supply.

This heating by electric pulses can be replaced by d.c. electric discharge heating. The said discharge also requires a d.c. supply able to supply voltages of about 10,000V. This supply must make it possible to maintain an electric discharge in the buffer gas at a stable mean value, whilst the impedance of the plasma formed by the buffer gas varies. In addition, half the power supplied by the power supply is lost in the ballast resistors needed for the satisfactory operation of the device.

It is clear that no matter which known means is used for heating the metal in a metal vapour laser, d.c. power supplies are necessary.

Heating by impulsive discharges calls on an element already incorporated in to the laser, namely the thyratron trigger system. However, this system is fragile and only operates for a limited number of hours. It is therefore prejudicial to use it for purposes other than for obtaining the laser effect. This device is not suitable for heating and for maintaining the metal at the appropriate temperature.

All the known devices for the heating of the metal in a copper vapour laser consequently suffer from maintanance problems and certain elements of the d.c. supplies and the thyratron must be frequently replaced. It is expensive to use them in equipment operating on an industrial site for heating purposes.

Another type of problem is caused by high temperature heating for degassing a material. In a known manner use is made of furnaces operating by the Joule effect. The elements to be degassed are incorporated in to an intermediate enclosure under vacuum. Heating is indirect, the heat propagating from the outside towards the inside of the enclosure. This configuration is not favourable, much energy being wasted before reaching the desired temperature.

Induction furnaces constitute a second type of known device permitting degassing. However, in this case, the degassing of the inductors occurring at high temperature pollutes the materials to be treated. It is clear that high temperature heating is a difficult operation and in particular causes problems varying depending upon the individual situation.

SUMMARY OF THE INVENTION

The object of the invention is to supply a very high temperature heating device without requiring a high voltage d.c supply and which can easily be adapted to different environments.

More specifically, the invention relates to a heating device comprising a refractory, insulating material tube filled with a buffer gas, two electrodes fixed to the tube so as to make it possible to produce and maintain an a.c. electric discharge between them, an a.c. power supply and a leakage field transformer having a primary winding with two terminals each connected to an output of said power supply and a secondary winding having two terminals, each connected to one of the said electrodes.

An a.c. electric discharge is initiated between the electrodes and the buffer gas then forms a plasma. Due to the a.c. nature of the discharge, it is possible to reduce the wear to the electrodes resulting from a monodirectional flow of current in the case of a d.c. discharge.

According to a preferred embodiment, the invention also has a gradator connected by a first input to an output of the power supply and by an output to the terminal of the primary winding corresponding to said output of the supply, said terminal being disconnected from said output.

This gradator makes it possible to give a greater flexibility of use to the device. Thus, the leakage field transformer supplies a voltage to the terminals of the secondary winding which is a function of the intensity of the current passing through the primary winding and the gradator makes it possible to vary this function.

Numerous gradator types can be used in a device according to the invention, namely a gradator with a saturatable choke, with a magnetic shunt, with thyristors and with a variable autotransformer. Preference is given to the use of a thyristor gradator.

The gradator can be controlled by a regulator, so as to obtain the desired electric power supplied to the terminals of the secondary winding. An output of said regulator is connected to a second input of the gradator. A first input of the regulator is connected to the terminals of the primary winding and makes it possible to measure the voltage at its terminals.

Another input of the regulator is connected to an intensity transformer located at the output of the gradator and permits the measurement of the current intensity.

This regulator makes it possible to automate the operation of the device according to the invention. It is then merely necessary for the user to display the desired electric power, supplied to the terminals of the secondary winding (which approximately corresponds to a temperature within the tube). The regulator controls the gradator so as to obtain said power.

The buffer gas can be made to flow in order to increase the life of the device. In this case, a first duct connects the tube to an input of a pneumatic circuit having at least one pump. A second duct connects it to an output of said pneumatic circuit. The buffer gas must be inert in order to prevent any chemical reaction and must be easily ionizable.

The gas can be chosen from among hydrogen ($H_2$), helium (He), neon (Ne), argon (Ar), krypton (Kr), xenon (Xe), nitrogen ($N_2$) and carbon dioxide gas ($CO_2$). It can also be a mixture of hydrogen and neon. In a preferred manner, the buffer gas is chosen from among neon, helium or a mixture of neon and hydrogen.

The tube is made from an insulating, refractory material and must be able to withstand heat shocks and high temperatures. It is preferably made from alumina.

The invention is described in greater detail hereinafter, relative to non-limitative embodiments and the attached drawings, wherein show:

DETAIL DESCRIPTION OF THE PREFERRED EMBODIMENT

Figure 1:
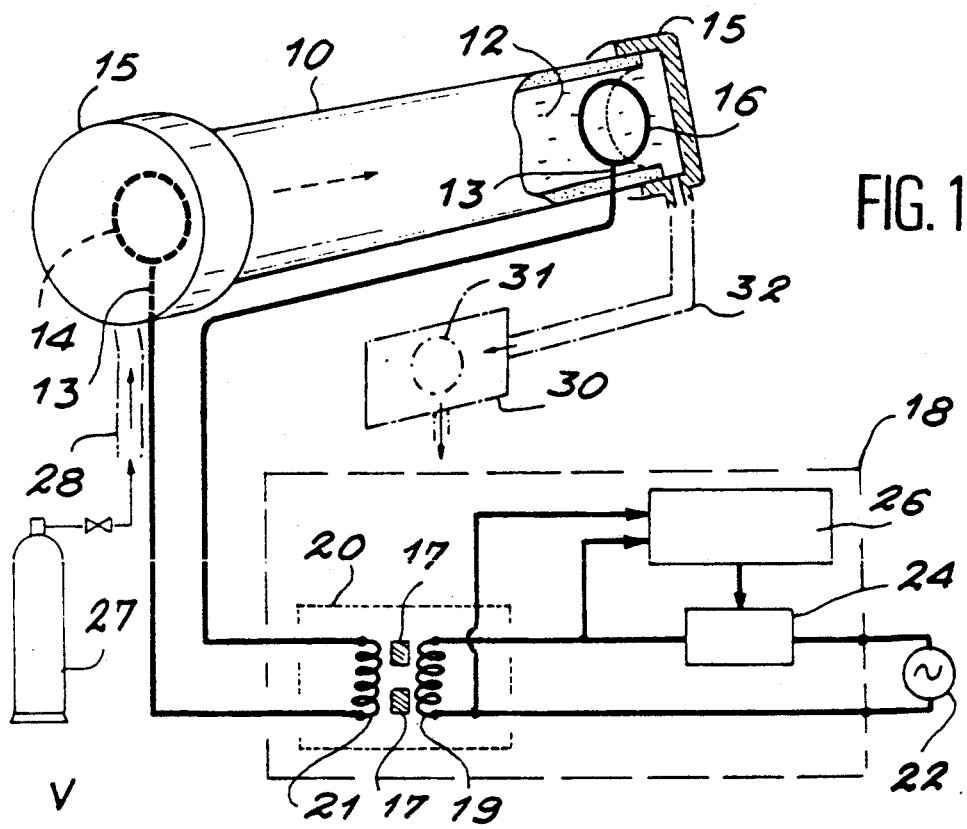
FIG. 1: diagrammatically and in perspective a device according to the invention.

FIG. 1 shows diagrammatically and in perspective a device according to the invention. A refractory, insulating material tube 10, e.g. of alumina, is filled with a buffer gas 12. The length of the tube 10 is dependent on the use of the device and can be e.g. between 0.1 and 2 m. The tube can be sealed at its end by two end fittings 15 made from an insulating, fractory material, e.g. alumina. The gas can be helium, neon or a mixture of neon and hydrogen (1% $H_2$ for 99% Ne at a pressure of a few kPa.

The buffer gas can be made to flow at a speed of approximately 1 l/h for example and can be replenished from an external buffer gas cylinder 27. In this case, the tube 10 is connected by a first duct 28 to the cylinder 27 equipped with an appropriate reduction valve and to a pneumatic circuit 30 having at least one pump 31 connected by a second duct 32.

The two electrodes 14, 16 are made from refractory metal, e.g. molybdenum or tungsten, or a non-refractory metal, e.g. copper and in this case they are cooled. They are fixed to the ends of the tube 10 by conductive attachments 13 made from refractory metal or a cooled non-refractory metal. These electrodes 14, 16 are e.g. annular, which makes it possible to obtain discharges having a cylindrical symmetry and consequently a better heat distribution within the tube.

Each of the electrodes 14, 16 is connected to an output of a system 18 making it possible to subject them to an a.c. voltage. The buffer gas forms a plasma under the effect of the discharge initiated between the electrodes. The system 18 comprises a leakage field transformer 20, which has a primary winding 19, a secondary winding 21 and at least one magnetic shunt 17. Each of the terminals of the secondary winding 21 is connected to an output of system 18. The magnetic flux losses are favoured when the current passing through the primary winding 19 increases. In other words, the voltage at the terminals of the secondary winding 21 decreases as the intensity of the current traversing the primary winding 19 increases. The law relating to the variation of the output voltage as a function of the input current governs the design of the transformer. Thus, it is possible to provide transformers adapted to the needs of each particular use.

The system 18 is connected to an a.c. power supply 22, which supplies a single-phase voltage of 380V at a frequency of e.g. 50Hz, which corresponds to the voltage at the terminals of the primary winding 19 of the transformer 20.

A first output of the power supply 22 is connected to a first terminal of the primary winding 19 of the leakage field transformer 20. A second output of supply 22 is connected to a first input of a gradator 24. An output of the latter is connected to a second terminal of the primary winding 19 of the leakage field transformer 20.

The gradator 24 e.g. incorporates thyristors and can be of the type manufactured by Eurotherm under reference 425.

The gradator 24 can be controlled by a regulator 26, which is connected by a first input to the terminals of the primary winding 19. A second input is connected to the output of the gradator 24. An output of the regulator 26 is connected to a second input of the gradator 24. Said regulator makes it possible to obtain the desired power supplied to the terminals of the secondary winding 21 of transformer 20. A given temperature within the tube roughly corresponds to said power.

Figure 2:
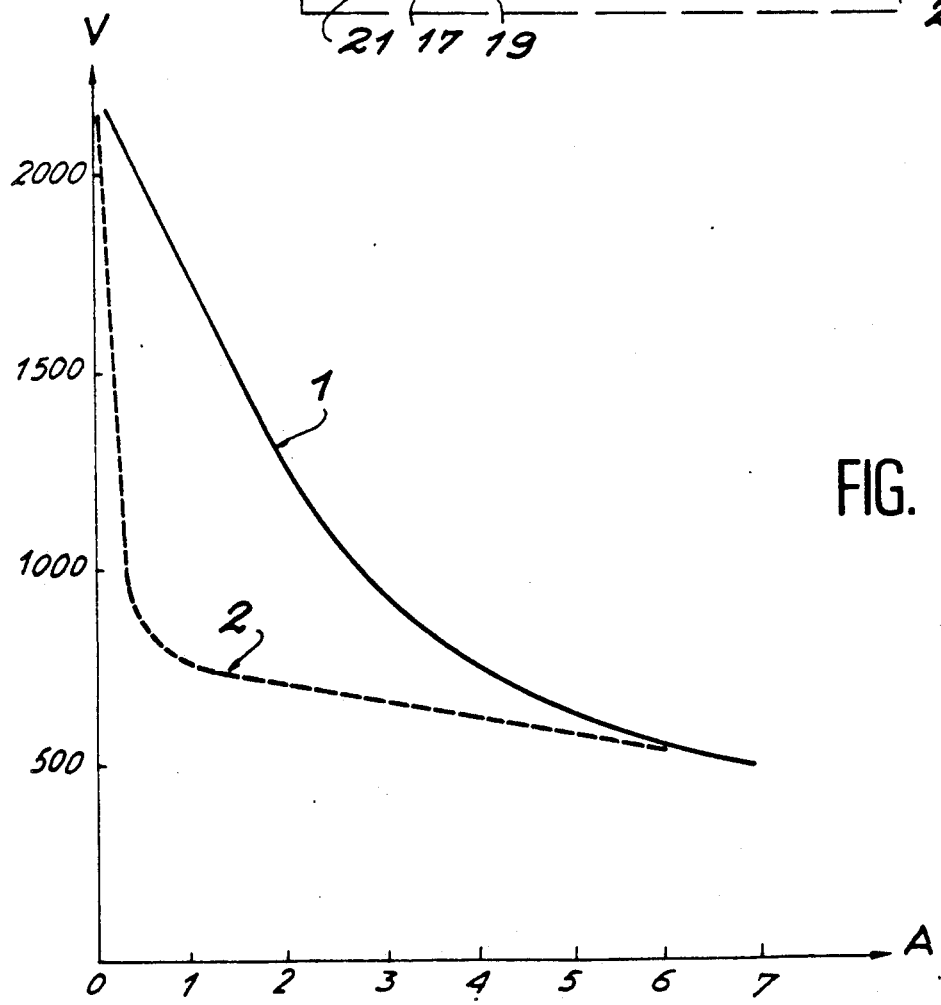
FIG. 2 diagrammatically operating curves of the leakage field transistor.

FIG. 2 diagrammatically shows the operating curve of a leakage field transformer, i.e. the voltage (in volts) at the terminals of the secondary 21 as a function of the current (in amperes) passing through the primary 19. The two curves shown constitute the operating limits of the device.

In continuous line form, curve 1 corresponds to the operation of the transformer 30 directly connected to the a.c. power supply 22 without gradator 24. This curve e.g. corresponds to the requirements as exist on manufacturing a transformer.

In broken line form, the curve 2 corresponds to the operation when the gradator 24 is connected. By adequately regulating the gradator 24 (or by controlling it by regulator 26), it is possible to obtain all the intermediate curves between 1 and 2.

Gradator 24 makes it possible to vary the operating curve and gives greater flexibility with respect to the use of the device.

In this example, the voltage at the terminals of the secondary passes from approximately 2200V to 1250V when the current rises to 2A, the voltage dropping roughly by half. This constitutes a most favourable operating plan for most uses.

Figure 3:
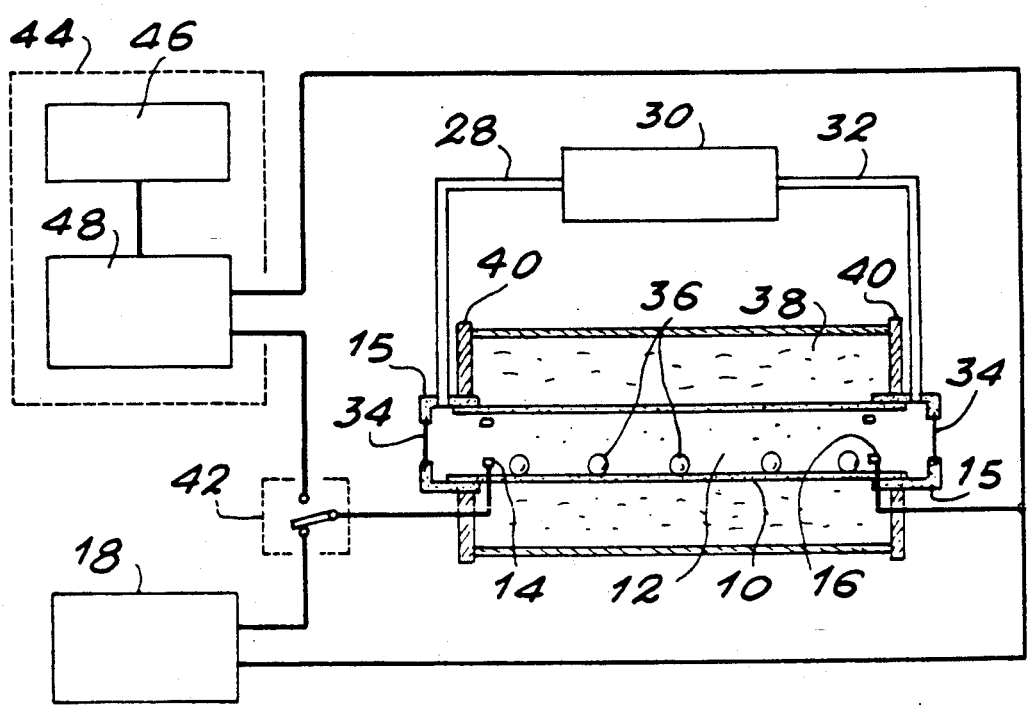
FIG. 3 diagrammatically and in section a head of a metal vapour laser equipped with a device according to the invention.

FIG. 3 shows diagrammatically and in section a head of a metal vapour laser equipped with a device according to the invention. The end fittings 15 have openings provided with windows 34 transparent to the radiation of the laser.

The metal balls 36 are contained in the tube 10 under an atmosphere of a mixture of neon and 1% hydrogen in an exemplified manner. The length of the tube is 1.5 m and its diameter is 40 mm in exemplified manner. Gas 12 can be circulated by the pneumatic circuit 30. In this example, the gas does not solely serve to stabilize the discharge and, when the laser is operating, it also avoids the vaporized metal being deposited on the walls of the tube 10 or on the windows 34.

This gas also has a complex function in radiative deenergizations, by favouring certain transitions between quantum levels of the metal vapour.

In order to avoid heat losses, the tube 10 is maintained in a sleeve 38 serving as a heat shield. This e.g. alumina sleeve 38 is held between two flanges 40.

A switch 42 makes it possible to connect the electrodes 14, 16 either to the outputs of the system 18 supplying the a.c. voltage necessary for preheating, or to the outputs of an electric pulse generator 44.

The device according to the invention makes it possible to heat the metal balls 36 to a temperature of approximately 1000° C., which is slightly below their melting point. It is in fact a preheating, which brings the laser into a watch state, so that it can be rapidly used.

If it is wished to trigger the laser, the switch 42 is switched so as to connect the electrodes 14, 16 to the pulse generator 44. The generator is constituted by a d.c. power supply 46 connected by one output to an input of a thyratron trigger system 48. One output of the latter is connected to the switch 42 and another to the electrode 16. The electric pulses then raise the temperature within the tube 10 so as to vaporize the metal. This operation only lasts roughly only 15 minutes. After this period, the pulses excite the metal vapor, so as to obtain the laser effect.

As a result of the device according to the invention the preheating and vaporization functions are fulfilled by separate devices, which makes it possible to save the d.c. power supply 44 and the thyratron of the trigger system 46, which are fragile, expensive components.

In addition, the possibility of placing the laser in a watch state means that it can operate in 15 minutes. Without this possibility, 90 minutes would be needed to heat the metal balls and vaporize them.

Figure 4:
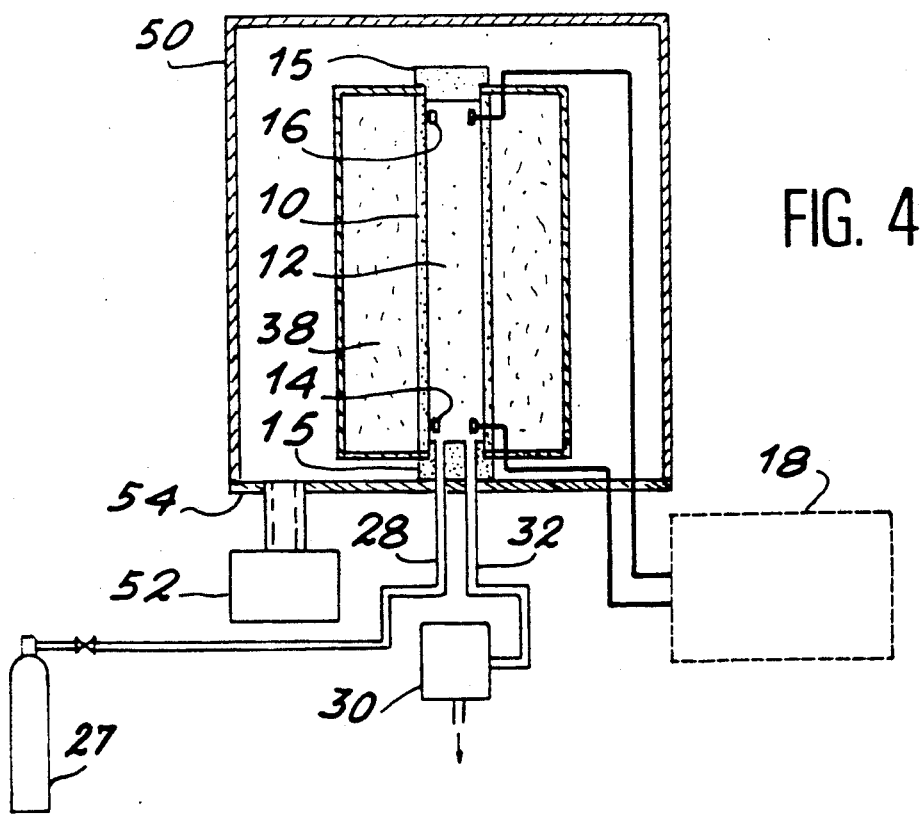
FIG. 4: diagrammatically and in section a degassing apparatus equipped with a device according to the invention.

FIG. 4 shows diagrammatically and in section a degassing apparatus equipped with a device according to the invention. The tube 10, sealed by the end fitting 15 and provided with electrodes 14, 16 at its ends, is positioned vertically beneath a bell-shaped member 50. The vacuum is maintained within the latter by pumping by a pump 52 connected to member 50.

The element to be degassed is also positioned within the bell-shaped member 50. The present degassing apparatus is particularly suitable for the degassing of the insulating sleeve 38 surrounding tube 10 applied to a metal vapour laser.

The buffer gas 12 can be static, or can be made to flow, or can be replenished within the tube 10 by pneumatic circuit 30. Advantageously, in the latter case the two ducts issue into the same end fitting 15. The latter is preferably fixed to the support 54 of the bell-shaped member 50. Orifices are made in support 54, so as to permit the different connections, namely to the vacuum pump 52, to the ducts 28, 32, and to the electrical connections of electrodes 24, 26 and system 18.

As a result of the device according to the invention the temperature of the element to be degassed can be raised to 2000° C. Advantageously the shape of the tube 10 can be adapted so as to permit a heating of the element "by the interior". Thus, the device is perfectly adapted to the degassing of the insulating sleeve 38, the tube 10 being introduced into the latter. In this way the heating takes place from the inside to the outside and favours degassing.

Figure 5:
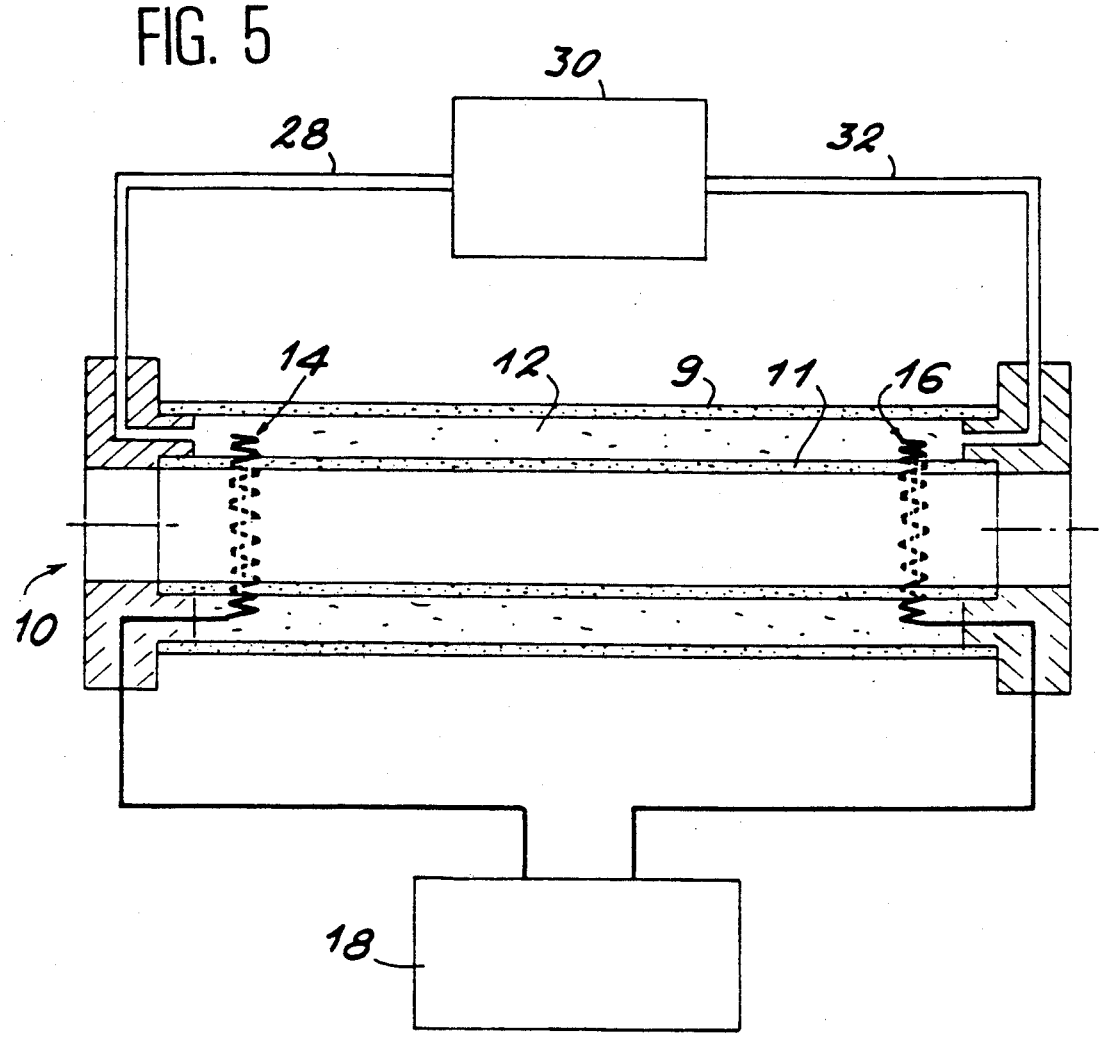
FIG. 5: diagrammatically and in section a variant of the device according to the invention.

FIG. 5 shows diagrammatically and in section a variant of the device according to the invention. The tube 10 has a first outer wall 9 and a second inner wall 11. The tube is e.g. cylindrical, the walls 9 and 10 being cylindrical and centred on the same axis. For example, the tube 10 can have a length of 2 m. a diameter of the outer wall 9 of 0.10 m and a diameter of the inner wall 11 of 0.04 m.

The buffer gas 12 can flow, can be replenished, or can be static between walls 9 and 11. It can be made to flow by the pneumatic circuit 30 connected by ducts 28 and 32 to the tube 10.

The electrodes 14 and 16 at the longitudinal ends of the tube 10 are e.g. annular. Advantageously, they have a toothed circumference, which favours the homogeneity of the discharge. They are contained between walls 9 and 11 and are connected to the system 18, so that they can be subject to an a.c. potential difference. System 18 comprises at least one leakage field transformer connected to an a.c. power supply (not shown in FIG. 5).

This variant allows the circulation of a fluid (liquid or vapour) raised to high temperature without cooling within the tube 10. A long distance is required this, several tubes can be placed end to end and can also be bent, so as to adapt the path of the fluid to the curves of the distance covered.

Figure 6:
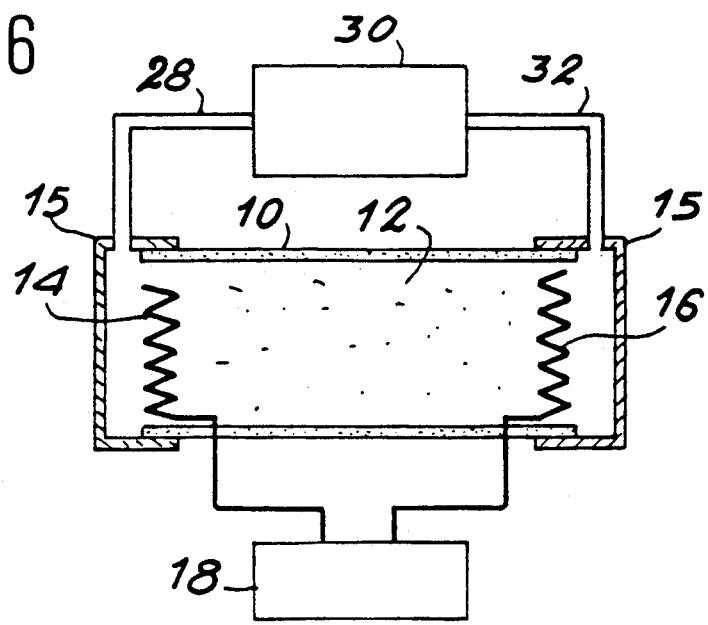
FIG. 6: diagrammatically and in a longitudinal section, another variant of the device according to the invention.

FIG. 6 diagrammatically shows in longitudinal section another variant. The tube 10 is a parallelepipedic. It is sealed at its two ends in tight manner by two end fittings 15. Within the tube 10, the buffer gas 12 can be circulating, can be plenished at a speed of 1 1/h under the action of the pneumatic circuit 30, but can also be static. Tube 10 is connected to the pneumatic circuit 30 by two ducts 28, 32.

Two electrodes 14, 16 are fixed to the ends of tube 10. These electrodes 14, 16 are connected to the system 18, so that they can be subject to an a.c. potential difference. This system 18 comprises at least one leakage field transformer connected to an a.c. power supply (not shown in FIG. 6).

The electrodes 14, 16 have a geometry, so that the discharge is as uniform as possible and in particular their periphery is toothed. The thus created plasma uniformly heats the walls of tube 10. This type of variant can be used as a heating element covering e.g. the inner walls of a furnace.

No matter which variant is adopted, the device according to the invention does not have any fragile element requiring regular maintenance. It permits the heating of objects contained within the tube, as well as objects outside the latter.

A device according to the invention is particularly suitable for obtaining high temperatures, but in fact it permits heating at random and in accordance with the electric power supplied from ambient temperature to a maximum temperature of about 2500° C.

The presently obtained maximum heating temperature is only limited by the materials from which the electrodes and tube are made. It is obvious that the invention covers materials other than those referred to hereinbefore. The choice of materials is dependent on the use intended for the device according to the invention and the same applies with respect to the choice of buffer gas.

I claim:

1. An alternating current electric discharge heating device for producing high temperatures, which comprises:

a refractory insulating container containing a region;

a buffer gas filling said region;

means, including first and second electrodes within said region that are fixed to the container, and an alternating current power supply having first and second power supply terminals which are coupled to the first and second electrodes, respectively, for creating and maintaining an alternating current electric discharge in said region, thereby heating said region.

2. A device according to claim 1, wherein:

said container includes a tube containing said buffer gas.

3. A device according to claim 1, which further comprises:

a leakage field transformer having first and second primary winding terminals and first and second secondary winding terminals, said first and second power supply terminals being coupled to said first and second primary winding terminals, respectively, and said first and second secondary winding terminals being connected to said first and second electrodes, respectively.

4. A device according to claim 3, which further comprises:

a gradator having a first input terminal connected to the first terminal of the power supply and an output terminal connected to the first primary winding terminal of said leakage field transformer.

5. A device according to claim 4, which further comprises:

a regulator having an output terminal connected to a second input terminal of said gradator, and input terminals which input the voltage across the primary winding of the leakage field transformer.

6. A device according to claim 1, wherein:

said region inside said container is bounded by the interior region between colinear inner and outer cylindrical surfaces of the container and first and second end surfaces that are connected to and at the ends of the cylindrical surfaces;

the first and second electrodes consist of refractory conducting material and are fixed to the container by attachments that are attached to the container near the end surfaces of the container.

7. A device according to claim 1, which further comprises:

an enclosure which can be evacuated, and said refractory insulating container being contained inside said enclosure.

8. An alternating current electric discharge heating device for producing high temperatures, which comprises:

a refractory insulating container which includes a tube;

a buffer gas filling said tube;

first and second electrodes within and fixed to said tube;

a leakage field transformer having first and second primary winding terminals and first and second secondary winding terminals, said first and second secondary winding terminals being connected to said first and second electrodes, respectively; and an alternating current power supply having first and second power supply terminals which are coupled to said first and second primary winding terminals, respectively.

9. A device according to claim 8, which further comprises:

a gradator having a first input terminal connected to the first terminal of the power supply and an output terminal connected to the first primary winding terminal of said leakage field transformer.

10. A device according to claim 9, which further comprises:

a regulator having an output terminal connected to a second input terminal of said gradator, and input terminals which input the voltage across the primary winding of the leakage field transformer.

11. A device according to claim 8, which further comprises:

an enclosure which can be evacuated, and said refractory insulating container being contained inside said enclosure.

12. An alternating current electric discharge heating device for producing high temperatures, which comprises:

a refractory insulating container having a contained region;

a buffer gas contained in said contained region;

said contained region inside said container being bounded by colinear inner and outer cylindrical surfaces of the container and first and second end surfaces that are connected to and at the ends of the cylindrical surfaces;

first and second electrodes which consist of refractory conducting material and are within the contained region and are fixed to said container by attachments near the end surfaces;

a leakage field transformer having first and second primary winding terminals and first and second secondary winding terminals, said first and second secondary winding terminals being connected to said first and second electrodes, respectively; and an alternating current power supply having first and second power supply terminals which are coupled to said first and second primary winding terminals, respectively.

13. A device according to claim 12, which further comprises:

an enclosure which can be evacuated, and said refractory insulating container being contained inside said enclosure.

* * * * *